US011365364B2

(12) United States Patent
Rankovic et al.

(10) Patent No.: US 11,365,364 B2
(45) Date of Patent: Jun. 21, 2022

(54) DROP-IN FUEL FOR REDUCING EMISSIONS IN COMPRESSION-IGNITED ENGINES

(71) Applicant: Saudi Arabian Oil Company, Dhahran (SA)

(72) Inventors: Nicolas Rankovic, Paris (FR); Patrick Gaillard, Asnieres sur Seine (FR); André Nicolle, Nanterre (FR)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/064,882

(22) Filed: Oct. 7, 2020

(65) Prior Publication Data

US 2022/0106533 A1    Apr. 7, 2022

(51) Int. Cl.
*C10L 1/198*        (2006.01)
*C10L 1/23*         (2006.01)
(Continued)

(52) U.S. Cl.
CPC ............. *C10L 1/1985* (2013.01); *C10L 1/231* (2013.01); *C10L 10/02* (2013.01); *C10L 10/12* (2013.01);
(Continued)

(58) Field of Classification Search
CPC ........ C10L 1/1985; C10L 1/231; C10L 10/12; C10L 10/02; C10L 2200/0415;
(Continued)

(56) References Cited

U.S. PATENT DOCUMENTS

| 2,763,537 A | 9/1956 | Barusch et al. |
| 4,464,182 A | 8/1984 | Tack et al. |

(Continued)

FOREIGN PATENT DOCUMENTS

| CN | 102977937 A | * | 3/2013 | ............... A61P 25/00 |
| CN | 107513441 A | * | 12/2017 | ................. C10L 1/02 |

(Continued)

OTHER PUBLICATIONS

International Search Report and Written Opinion dated Jun. 9, 2021 pertaining to International application No. PCT/US2020/057497 filed Oct. 27, 2020, 12 pages.

*Primary Examiner* — Pamela H Weiss
(74) *Attorney, Agent, or Firm* — Dinsmore & Shohl LLP

(57) ABSTRACT

A fuel formulation having a derived cetane number of at least 35 includes a petroleum fraction and a polyoxymethylene dimethyl ether (OMEx) oligomer mix. The petroleum fraction includes a naphtha fraction with a boiling point in the range from 30° C. to 178° C. The polyoxymethylene dimethyl ether oligomer mix has the general formula $H_3CO—(CH_2O)_n—CH_3$ in which n is between 2 and 7, inclusive. A related method for reducing emissions in a compression-ignited engine includes preparing the fuel formulation having a derived cetane number of at least 35 and combusting the fuel formulation in the compression-ignited engine in place of a diesel fuel, thereby reducing emission of at least one of NOx, $CO_2$, or particulates from the compression-ignited engine.

14 Claims, 12 Drawing Sheets

(51) Int. Cl.
  *C10L 10/02* (2006.01)
  *C10L 10/12* (2006.01)
(52) U.S. Cl.
  CPC .................. *C10L 2200/0415* (2013.01); *C10L 2200/0446* (2013.01); *C10L 2270/026* (2013.01)
(58) Field of Classification Search
  CPC ....... C10L 2200/0446; C10L 2270/026; C10L 1/185; C10L 1/026; C10G 2300/301; C10G 2300/307; C10G 2300/4043; C10G 2300/405
  See application file for complete search history.

(56) References Cited

U.S. PATENT DOCUMENTS

| | | | |
|---|---|---|---|
| 5,746,785 A * | 5/1998 | Moulton | C10L 1/10 44/443 |
| 8,298,303 B2 | 10/2012 | Jacob | |
| 2002/0020107 A1 * | 2/2002 | Bailey | C10L 10/02 44/447 |
| 2004/0237383 A1 * | 12/2004 | Daly | C10L 1/328 44/301 |
| 2008/0216390 A1 * | 9/2008 | Tebben | C10L 1/1852 44/307 |
| 2011/0126450 A1 * | 6/2011 | Price | C10L 1/026 44/447 |
| 2011/0131871 A1 | 6/2011 | Jacob | |
| 2014/0223807 A1 | 8/2014 | Jacob | |
| 2019/0119590 A1 * | 4/2019 | Waguespack | C10L 1/1981 |
| 2019/0390127 A1 | 12/2019 | Manente | |

FOREIGN PATENT DOCUMENTS

| | | | | |
|---|---|---|---|---|
| EP | 1914293 A1 * | 4/2008 | ............ | C10L 1/1852 |
| EP | 2977434 A1 | 1/2016 | | |
| WO | 2012046169 A1 | 4/2012 | | |
| WO | WO-2012046169 A1 * | 4/2012 | ............ | C10L 1/1852 |
| WO | WO-2019016700 A1 * | 1/2019 | ............ | C10L 10/12 |
| WO | WO-2019062052 A1 * | 4/2019 | ............ | C10L 10/12 |
| WO | 2020120834 A1 | 6/2020 | | |

* cited by examiner

DROP-IN FUEL FOR REDUCING EMISSIONS IN COMPRESSION-IGNITED ENGINES

BACKGROUND

Field

The present disclosure relates to a fuel formulation, and more particularly, to a fuel formulation having a derived cetane number of at least 35 for use as a drop-in fuel for reducing emissions in a compression-ignited engine.

Technical Background

Petroleum-based fuels are used to power the vast majority of vehicles. For example, gasoline, diesel fuel, and natural gas are relatively inexpensive and widely available for users, and are utilized to power internal combustion engines of vehicles throughout the world. However, the combustion of petroleum-based fuels may release pollutants into the environment, which may be undesirable for a number of reasons. Specifically, the gases emitted by diesel engines contain particulates, nitrogen oxides, hydrocarbons and aldehydes, carbon monoxide, and carbon dioxide. This release of pollutants is especially prevalent in older diesel engines utilized in locations that have not implemented updated emission standards. As wholesale replacement of diesel engines in such locations with modern engines designed for stricter emissions standards is both cost and impractical, solutions are needed which can allow existing diesel engine stocks to operate with reduced release of pollutants.

BRIEF SUMMARY

One strategy for reducing the emission of pollutants from older diesel engine stocks is the introduction of a drop-in fuel which when used to operate such older diesel engines generates comparatively reduced emissions than the currently available diesel fuels. For purposes of this disclosure, a "drop-in fuel" is a completely interchangeable substitute for conventional petroleum-derived hydrocarbons (gasoline, jet fuel, and diesel), meaning it does not require adaptation of the engine, fuel system or the fuel distribution network. It can be used as a direct replacement for a current fuel in currently available engines either in pure form and/or blended in any amount with other fuels.

According to one or more embodiments of the present disclosure, a fuel formulation having a derived cetane number of at least 35 is disclosed. The fuel formulation includes a petroleum fraction and a polyoxymethylene dimethyl ether (OMEx) oligomer mix. The petroleum fraction includes a naphtha fraction with a boiling point in the range from 30° C. to 178° C. The polyoxymethylene dimethyl ether oligomer mix has a general formula $H_3CO-(CH_2O)_n-CH_3$ in which n is between 2 and 7, inclusive.

According to one or more further embodiments of the present disclosure, a method for reducing emissions in a compression-ignited engine is disclosed. The method includes preparing a fuel formulation and combusting the fuel formulation in the compression-ignited engine in place of a diesel fuel, thereby reducing emission of at least one of NOx, $CO_2$, or particulates from the compression-ignited engine. The fuel formulation includes a petroleum fraction and a polyoxymethylene dimethyl ether (OMEx) oligomer mix. The petroleum fraction includes a naphtha fraction with a boiling point in the range from 30° C. to 178° C. The polyoxymethylene dimethyl ether oligomer mix has a general formula $H_3CO-(CH_2O)_n-CH_3$ in which n is between 2 and 7, inclusive.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings in which.

DETAILED DESCRIPTION

Figure 1A:
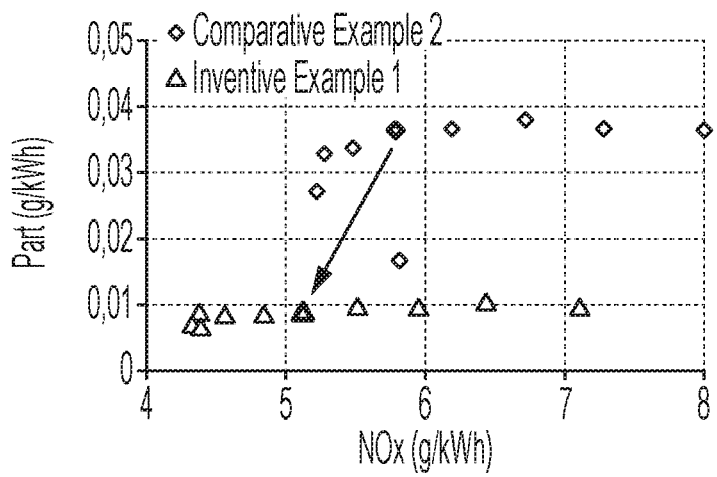
FIG. 1A graphically illustrates the NOx and soot/particulate trade-off at engine operating conditions of 1260 rpm and 25% of maximal load for commercially available diesel fuel and a fuel formulation according to one or more embodiments shown and described herein.

Embodiments described herein are generally directed to fuel formulations having a derived cetane number of at least 35. In embodiments described herein, the fuel formulation comprises a petroleum fraction and a polyoxymethylene dimethyl ether (OMEx) oligomer mix. The petroleum fraction comprises a naphtha fraction with a boiling point in the range from 30° C. to 178° C. Further, the polyoxymethylene dimethyl ether (OMEx) oligomer mix has a formula in accordance with Formula I in which n is between 2 and 7, inclusive. These and other embodiments of a fuel formulation are disclosed in greater detail herein with reference to the appended figures.

  Formula I

As one skilled in the art is aware, crude oil is typically distilled and fractionated into several cuts ranging from gaseous streams to streams with a boiling point of 500° C. and above. An initial fraction drawn from 30° C. until 70° C. is typically termed light naphtha and will be defined as such for purposes of the present disclosure. Similarly, a second fraction drawn from 70° C. until 178° C. is typically termed heavy naphtha and will be defined as such for purposes of the present disclosure. The light naphtha and the heavy naphtha may collectively be referenced as naphtha. Fractions drawn below naphtha in a conventional distillation or fractioning tower correspond to kerosene having a boiling range from 178° C. to 225° C. and diesel having a boiling range from 225° C. to 370° C. It will be appreciated that these cut points are limited by the nature of the crude oil, type of refinery, and by the local demand for individual products and their specifications.

Typically, light and heavy naphtha are further processed in a refinery to produce gasoline, and blended with other streams to reach specifications for commercial gasoline. However, conventional Diesel or compression-ignited engines are usually powered using diesel boiling range fuel (Diesel, heating oil, heavy or residual oil) with naphtha and associated derivatives not originally intended for this use. As the global demand for diesel fuel in the upcoming decades is forecast to rise significantly, refineries are unlikely to meet the forecasted Diesel fuel demand without significant capital investments, to process additional fuels. However, development of the present fuel formulation allows petroleum cuts traditionally not useful in compression-ignited engines, such as naphtha, to be utilized to power compression-ignited engines and relieve the anticipated supply stress on global refineries as diesel fuels demand rises.

In one or more embodiments, the fuel formulation is based on blending refinery streams having a boiling range between 30° C. to 178° C. which corresponds with naphtha petroleum cuts with the polyoxymethylene dimethyl ether oligomer mix. It will be appreciated that such formulation represents a complete replacement of commercial diesel as diesel is obtained from refinery streams having a boiling range between 225° C. to 370° C.

In various embodiments, the fuel formulation comprises 50 to 90 volume percent (vol. %), 60 to 90 vol. %, 70 to 90 vol. %, or 80 to 90 vol. % of the petroleum fraction. The remainder of the fuel formulation may comprise the polyoxymethylene dimethyl ether oligomer mix and optionally one or more additives.

The composition of the petroleum fraction effects the ability to utilize the resulting fuel in a compression-ignited engine. As previously indicated, traditional diesel fuel is obtained from refinery streams having a boiling range between 225° C. to 370° C. with the lighter (lesser boiling temperature) streams utilized for gasoline or other products. However, the fuel formulation of the present disclosure allows streams with a boiling range less than 225° C. to be utilized in a compression-ignited engine. In one or more embodiments, the petroleum fraction comprises a naphtha fraction with a boiling point in the range from 30° C. to 178° C. In one or more further embodiments, the petroleum fraction comprises a naphtha fraction with a boiling point in the range from 85° C. to 178° C. In one or more further embodiments, the petroleum fraction comprises a naphtha fraction with a boiling point in the range from 70° C. to 150° C. In yet one or more further embodiments, the petroleum fraction comprises a naphtha fraction with a boiling point in the range from 30° C. to 70° C. In various embodiments, the petroleum fraction may comprise 60 vol. % to 100 vol. % of the naphtha fraction, 70 vol. % to 100 vol. % of the naphtha fraction, 80 vol. % to 100 vol. % of the naphtha fraction, 90 vol. % to 100 vol. % of the naphtha fraction, 95 vol. % to 100 vol. % of the naphtha fraction, or 99 vol. % to 100 vol. % of the naphtha fraction.

In the various embodiments, a boiling point range for the naphtha fraction in the petroleum fraction is provided. It will be appreciated that the naphtha fraction may comprise all the cuts from the distillation or fractionating column over the entire expanse of the range or the cuts formed from one or more subsets within the range. For example, indication of a petroleum fraction with a naphtha fraction boiling point in the range from 30° C. to 178° C. may include all cuts from the distillation or fractionating column from 30° C. to 178° C. or may include only a subset of the range such as 85° C. to 150° C. with both explanations explicitly included as potential embodiments.

As the petroleum fraction comprises the naphtha fraction, it will be appreciated that the petroleum fraction consists mainly of straight-chained, branched, and cyclic aliphatic hydrocarbons. As such, aromatics and olefins are expressly minimized. In various embodiments, the petroleum fraction comprises less than 25 vol. % aromatics, less than 20 vol. % aromatics, less than 15 vol. % aromatics, or less than 10 vol. % aromatics.

In one or more embodiments, the fuel formulation comprises at least 10 percent by mass (wt. %) of the polyoxymethylene dimethyl ether oligomer mix. In various embodiments, the fuel formulation may comprise 10 to 40 wt. % of the polyoxymethylene dimethyl ether oligomer mix, 10 to 30 wt. % of the polyoxymethylene dimethyl ether oligomer mix, 10 to 20 wt. % of the polyoxymethylene dimethyl ether oligomer mix, 12 to 20 wt. % of the polyoxymethylene dimethyl ether oligomer mix, or 12 to 17 wt. % of the polyoxymethylene dimethyl ether oligomer mix.

In one or more embodiments, the polyoxymethylene dimethyl ether oligomer mix comprises at least 90 wt. % of Formula I where n is equal to 2, 3, 4, 5, or 6. In various embodiments, the polyoxymethylene dimethyl ether oligomer mix comprises at least 92 wt. %, at least 95 wt. %, at least 97 wt. %, or at least 98 wt. % of Formula I where n is equal to 2, 3, 4, 5, or 6.

In one or more embodiments, the polyoxymethylene dimethyl ether oligomer mix comprises at least 90 wt. % of Formula I where n is equal to 3 or 4. In various embodiments, the polyoxymethylene dimethyl ether oligomer mix comprises at least 92 wt. %, at least 94 wt. %, at least 95 wt. %, or at least 97 wt. % of Formula I where n is equal to 3 or 4.

The fuel formulation may further comprise a pro-cetane additive. For purposes of this disclosure, a pro-cetane additive is a chemical compound which enhances or increases the cetane measurement of a fuel formulation. Due to its chemical composition, a pro-cetane additive has the capability to decompose at a lesser temperature than Diesel fuel.

As such, the pro-cetane additive's exothermic decomposition leads to successive fuel reactions which result in the initiation of combustion at a lesser temperature. Specifically, the addition of the pro-cetane additive to the petroleum fraction and the polyoxymethylene dimethyl ether oligomer mix results in an increased cetane number for the fuel formulation and allows it to express a reduced auto ignition temperature In various embodiments, the pro-cetane additive is a nitrate, a nitroalkane, a nitrocarbonate, or a peroxide. In one or more embodiments, the pro-cetane additive is a nitroalkane. An example nitroalkane suitable for utilization as a pro-cetane additive of 2-ethylhexy nitrate (2-EHN).

The pro-cetane additive may be added to the fuel formulation at 100 parts per million (ppm) to 5 volume percent (vol. %). In various embodiments, the pro-cetane additive is provided to the fuel formulation at 0.25 vol. % to 5 vol. %, 0.25 vol. % to 4 vol. %, 0.25 vol. % to 3 vol. %, or 0.25 vol. % to 2 vol. %. In one or more specific embodiments, the pro-cetane additive is provided as 2-EHN at 0.25 vol. % to 1 vol. % of the fuel formulation.

It will be appreciated that cetane number may be measured according to industry standards in conformity with ASTM D-613 (ISO 5165) for the Cooperative Fuel Research (CFR) engine, or using derived cetane number (IQT), ASTM D6890.

In one or more embodiments, a lubricity additive may be added to the fuel formulation at up to 200 ppm.

The fuel formulation in accordance with the present disclosure may be utilized in a compression-ignited engine to reduce emissions from the compression-ignited engine. Specifically, in one or more embodiments, a fuel formulation prepared in accordance with the present disclosure may be combusted in the compression-ignited engine in place of a diesel fuel, thereby reducing emission of at least one of NOx, $CO_2$, or particulates from the compression-ignited engine.

EXAMPLES

Having described various embodiments of the fuel formulation of the present disclosure, the fuel formulations will be further illustrated with the aid of examples. The examples are not, however, to be construed as limiting or restricting with respect to the breadth of the fuel formulations present by the present disclosure as a whole.

Fuel formulations in conformity with that described in the present disclosure as well as commercially available diesel fuel were evaluated for performance and pollutant generation. In general, evaluation was completed in a heavy-duty engine calibrated using Euro II settings to best represent a heavy-duty engine fleet operating in countries which have not yet implemented recent emission standards.

An example formulation in conformity with embodiments of the present disclosure was prepared as Inventive Example 1. Inventive Example 1 was prepared by combining a heavy naphtha, an OMEx oligomer mix, and a pro-cetane additive in combination. Specifically heavy naphtha, the OMEx oligomer mix, and 2-EHN were combined to prepare the fuel formulation of Inventive Example 1. Heavy naphtha representing a petroleum fraction with a boiling point in the range from 85° C. to 178° C. comprises 84.46 vol. % of Inventive Example 1.

The heavy naphtha utilized in Inventive Example 1 comprises a calculated cetane number of 37.8, a measured CFR cetane number of 32.6, a density of 730 kilograms per cubic meter ($kg/m^3$) at 15° C., and a net calorific value of 44,200 kiloJoules per kilogram (kJ/kg). The PIONA (paraffins, isoparaffins, olefins, naphthenes, and aromatics) make-up of the petroleum fraction utilized in the fuel formulation of Inventive Example 1 is provided in Table 1 as measured according to ASTM D6730 mod.

TABLE 1

| PIONA of Petroleum Fraction | |
|---|---|
| Paraffins | 29.0% v/v |
| Isoparaffins | 41.3% v/v |
| Olefins | 0.3% v/v |
| Naphthenes | 15.2% v/v |
| Aromatics | 6.0% v/v |
| Unknown | 8.1% v/v |

The OMEx oligomer mix comprises 14.91 vol. % of Inventive Example 1. The properties of the OMEx oligomer mix utilized in the fuel formulation of Inventive Example 1 are provided in Table 2. The pro-cetane additive in the form of 2-EHN comprises 0.63 vol. % of Inventive Example 1.

TABLE 2

| OMEx Properties | | | |
|---|---|---|---|
| Parameter | Units | Method | Result |
| OME2 content | % | ASG 1916-GC-FID | 0.6 |
| OME3 content | % | | 73.1 |
| OME4 content | % | | 24.4 |
| OME5 content | % | | 0.8 |
| OME6 content | % | | 0.1 |
| Density (15° C.) | $kg/m^3$ | DIN EN ISO 12185 | 1045.9 |
| Sulphur content | milligrams per kilogram (mg/kq) | DIN EN ISO 20884 | <5 (<1) |
| Flash point | ° C. | DIN EN ISO 2719 | 54.5 |
| Ash content (775° C.) | % (m/m) | DIN EN ISO 6245 | <0.005 |
| Water content | mg/kg | DIN EN ISO 12937 | 65 |
| Total contamination | mg/kg | DIN EN 12662:1998 | 1 |
| HFRR (Lubricity) | Micrometers (µm) | DIN EN ISO 12156-1 | 381 |
| Kin. viscosity (40° C.) | Millimeters squared per second ($mm^2/s$) | DIN EN ISO 3104 | 0.9565 |
| 95% (V/V) recovery temperature | ° C. | DIN EN 51435 | 180.3 |
| Cold filter plugging point (CFPP) | ° C. | DIN EN 116 | −50 |
| Cloud point | ° C. | DIN EN 23015 | −50 |
| Carbon content | % (m/m) | DIN 51732 | 44.0 |
| Hydrogen content | % (m/m) | | 8.93 |
| Nitrogen content | % (m/m) | | <0.5 |
| Oxygen content | % (m/m) | DIN 51732 mod. | 46.1 |
| Calorific value, tower | MegaJoules per kilogram (MJ/kg) | DIN 51900-2 mod. | 18.8 |

A comparative fuel formulation representing commercial diesel fuel was provided as Comparative Example 2. Comparative Example 2 represents 100 vol. % of Euro V standard EN590 diesel fuel. The Euro V standard EN590 diesel fuel utilized to form Comparative Example 2 comprises a measured CFR cetane number of 52.4, a density of 836.2 $kg/m^3$ at 15° C., a viscosity of 2.644 $mm^2/s$ at 40° C., a sulfur content of <3 parts per million (ppm), and a net calorific value of 42,410 kJ/kg.

Testing of the Example fuel formulation (Inventive Example 1) and commercially available comparative diesel fuel (Comparative Example 2) was completed on an engine calibrated according to Euro II emission regulations. Specifically, the test engine was a Renault Euro II 062045 engine which has 6 cylinders and generates 300-400 horsepower (HP).

For the reference of the reader, the Euro II regulations and cycle for heavy-duty diesel engines (October 1997 revision) are provided subsequently in Table 3.

TABLE 3

Euro II Regulations and Cycle

| | Cycle | Hydrocarbons (HC) (g/kWh) | Carbon Monoxide (CO) (g/kWh) | Nitrogen Oxide ($NO_x$) (g/kWh) | Particulate Matter (PM) (g/kWh) |
|---|---|---|---|---|---|
| Euro II | ECE R-49 | 1.1 | 4 | 7 | 0.15 |

The test protocol included operating the test engine at 12 defined points with varying engine speed and brake mean effective pressure (BMEP). It will be known and appreciated by one skilled in the art that BMEP is the mean pressure which, if imposed on the pistons of the engine uniformly from the top to the bottom of each power stroke, would produce the measured (brake) power output. Testing was completed at a series of three engine speeds designated by a series of letters as "A", "B", and "C". Engine speed A corresponds to 1260 rotations per minute (rpm). Engine speed B corresponds to 1580 rpm. Engine speed C corresponds to 1900 rpm. Similarly, at each engine speed, the engine was operated at 25%, 50%, 75%, and 100% of the maximal load. Table 4 provides the BMEP corresponding to each operating condition.

TABLE 4

| | A25 | A50 | A75 | A100 | B25 | B50 | B75 | B100 | C25 | C50 | C75 | C100 |
|---|---|---|---|---|---|---|---|---|---|---|---|---|
| Engine Speed (rpm) | 1260 | 1260 | 1260 | 1260 | 1580 | 1580 | 1580 | 1580 | 1900 | 1900 | 1900 | 1900 |
| Loading (%) | 25 | 50 | 75 | 100 | 25 | 50 | 75 | 100 | 25 | 50 | 75 | 100 |
| BMEP (bar) | 3.3 | 6.5 | 9.9 | 12.9 | 3.2 | 6.3 | 9.8 | 12.9 | 2.9 | 5.9 | 8.9 | 11.9 |

At each of the 12 operating conditions of the test engine, measurement of pollutant output from the test engine was carried out. Specifically, measurements of hydrocarbons (HC), carbon monoxide (CO), nitrous oxide (NOx), and smoke opacity were made from the outputs of the test engine. Measurement of carbon dioxide ($CO_2$) was made at the tailpipe. The smoke opacity was measured using a AVL 415S smoke meter commercially available from AVL, Gratz, Austria. The smoke opacity from the smoke meter was then able to be correlated with generation of particulates using MIRA correlations from the UK's Motor Industry Research Association (MIRA). Such correlations are known and familiar to those skilled in the art.

Figure 1B:
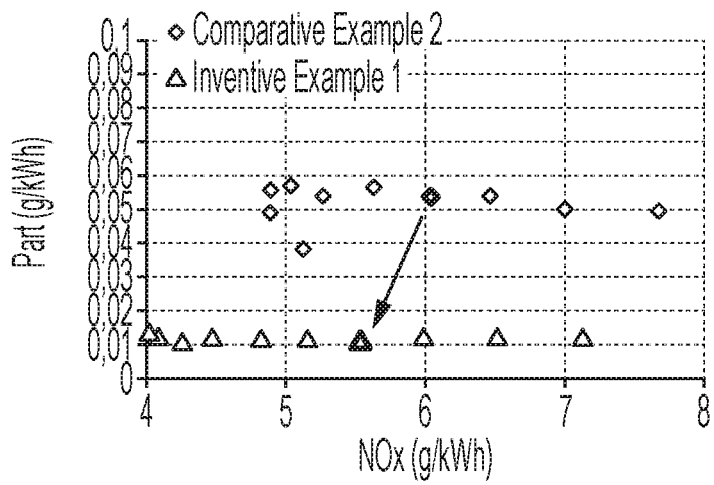
FIG. 1B graphically illustrates the NOx and soot/particulate trade-off at engine operating conditions of 1580 rpm and 25% of maximal load for commercially available diesel fuel and a fuel formulation according to one or more embodiments shown and described herein.
Figure 1C:
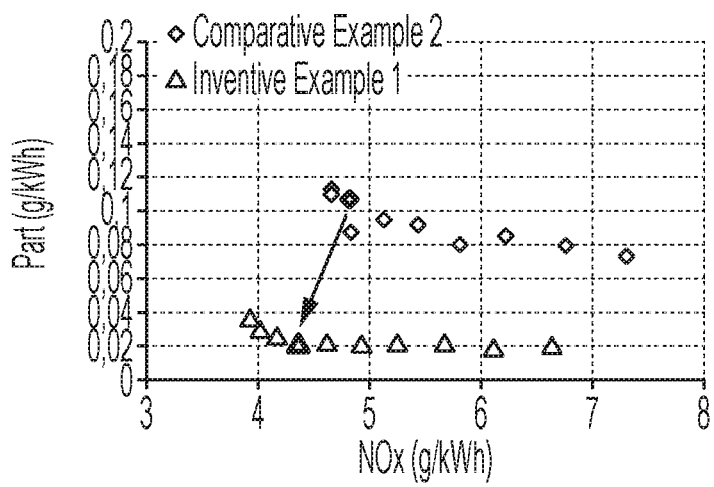
FIG. 1C graphically illustrates the NOx and soot/particulate trade-off at engine operating conditions of 1900 rpm and 25% of maximal load for commercially available diesel fuel and a fuel formulation according to one or more embodiments shown and described herein.
Figure 2A:
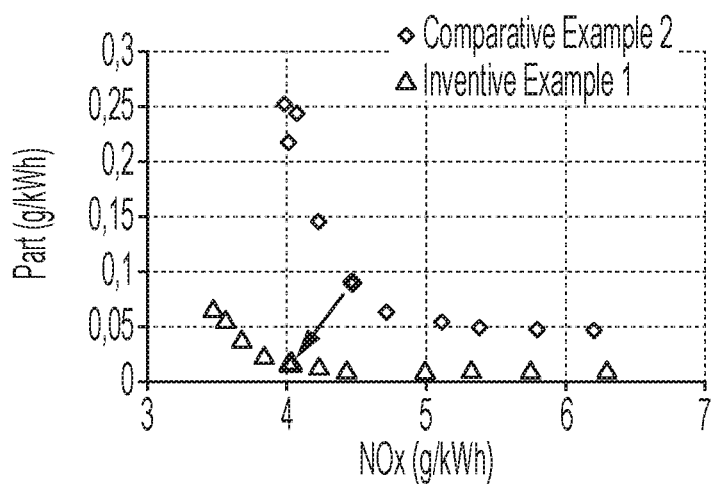
FIG. 2A graphically illustrates the NOx and soot/particulate trade-off at engine operating conditions of 1260 rpm and 50% of maximal load for commercially available diesel fuel and a fuel formulation according to one or more embodiments shown and described herein.
Figure 2B:
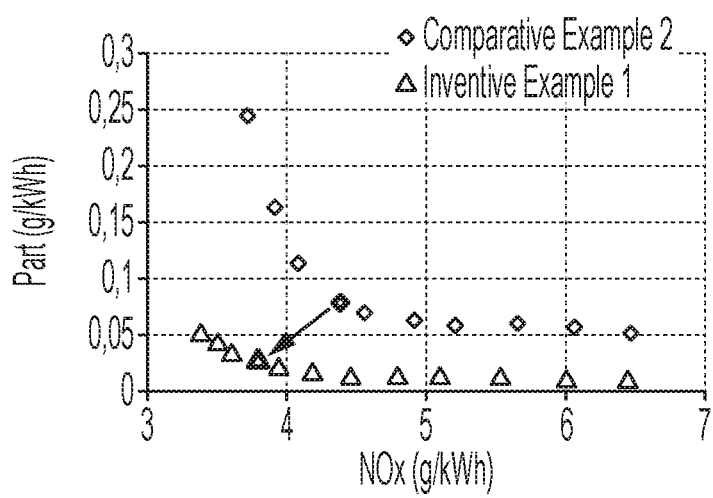
FIG. 2B graphically illustrates the NOx and soot/particulate trade-off at engine operating conditions of 1580 rpm and 50% of maximal load for commercially available diesel fuel and a fuel formulation according to one or more embodiments shown and described herein.
Figure 2C:
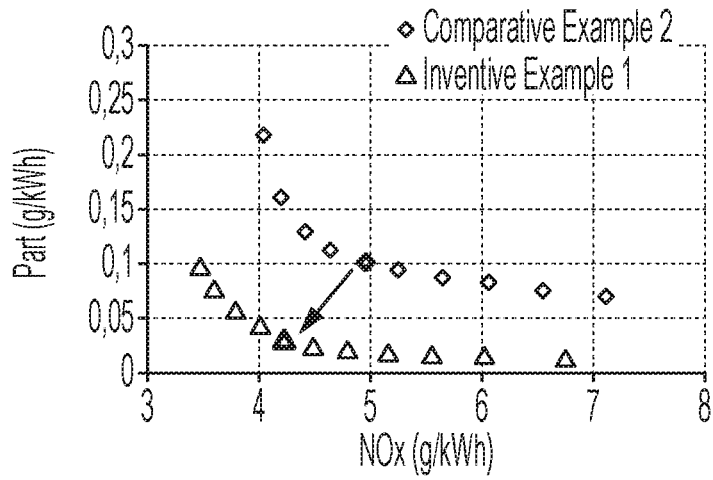
FIG. 2C graphically illustrates the NOx and soot/particulate trade-off at engine operating conditions of 1900 rpm and 50% of maximal load for commercially available diesel fuel and a fuel formulation according to one or more embodiments shown and described herein.
Figure 3A:
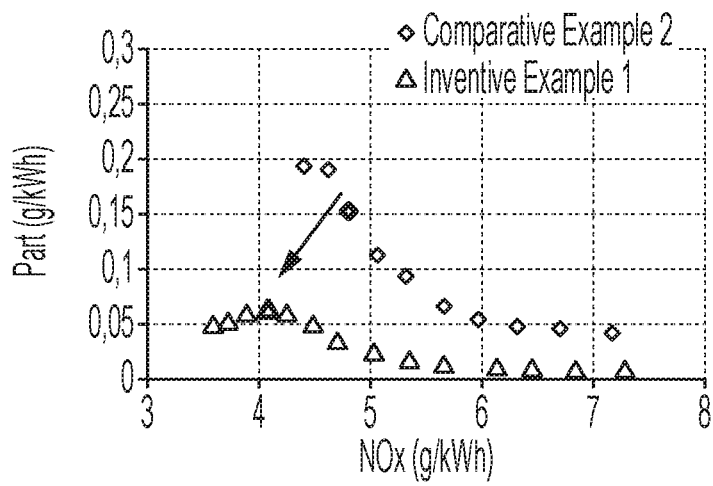
FIG. 3A graphically illustrates the NOx and soot/particulate trade-off at engine operating conditions of 1260 rpm and 75% of maximal load for commercially available diesel fuel and a fuel formulation according to one or more embodiments shown and described herein.
Figure 3B:
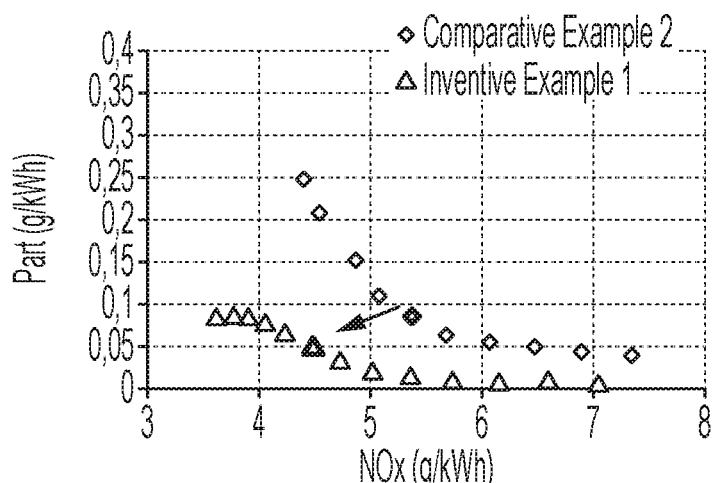
FIG. 3B graphically illustrates the NOx and soot/particulate trade-off at engine operating conditions of 1580 rpm and 75% of maximal load for commercially available diesel fuel and a fuel formulation according to one or more embodiments shown and described herein.
Figure 3C:
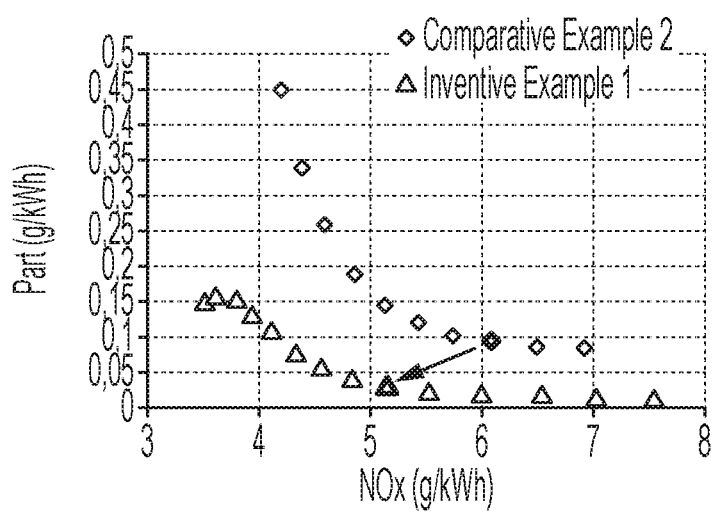
FIG. 3C graphically illustrates the NOx and soot/particulate trade-off at engine operating conditions of 1900 rpm and 75% of maximal load for commercially available diesel fuel and a fuel formulation according to one or more embodiments shown and described herein.
Figure 4A:
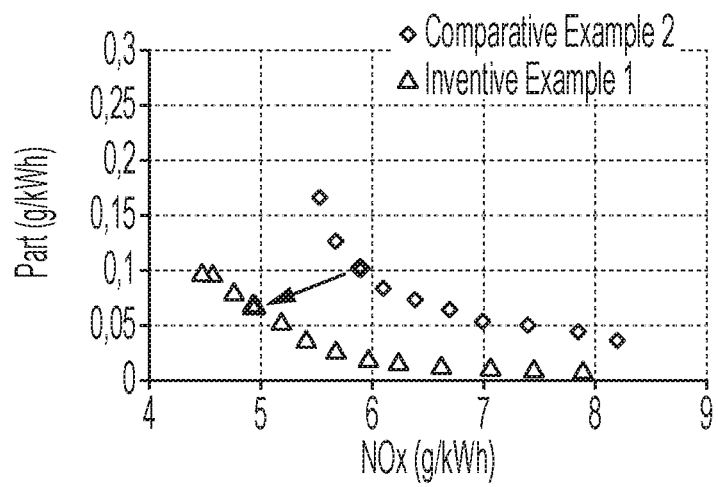
FIG. 4A graphically illustrates the NOx and soot/particulate trade-off at engine operating conditions of 1260 rpm and 100% of maximal load for commercially available diesel fuel and a fuel formulation according to one or more embodiments shown and described herein.
Figure 4B:
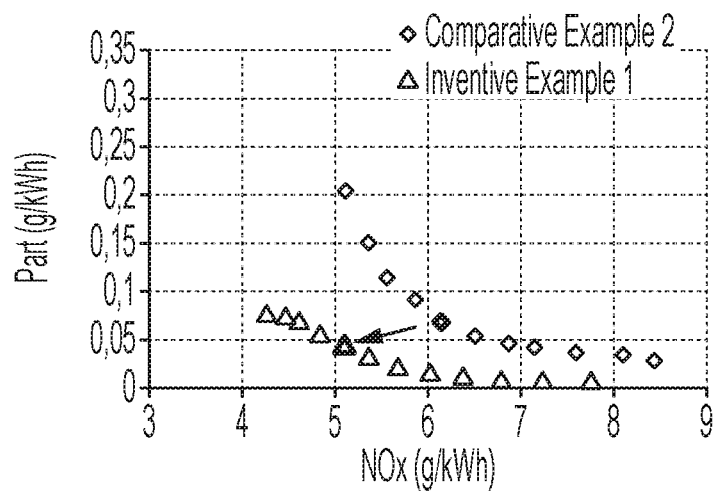
FIG. 4B graphically illustrates the NOx and soot/particulate trade-off at engine operating conditions of 1580 rpm and 100% of maximal load for commercially available diesel fuel and a fuel formulation according to one or more embodiments shown and described herein.
Figure 4C:
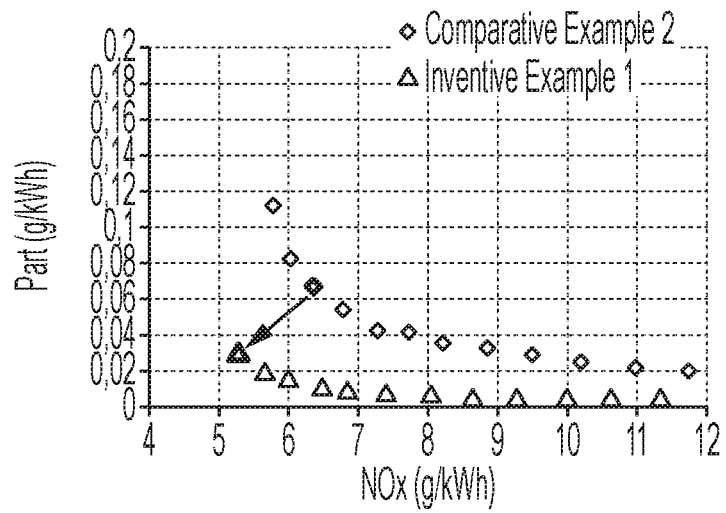
FIG. 4C graphically illustrates the NOx and soot/particulate trade-off at engine operating conditions of 1900 rpm and 100% of maximal load for commercially available diesel fuel and a fuel formulation according to one or more embodiments shown and described herein.
Figure 5A:
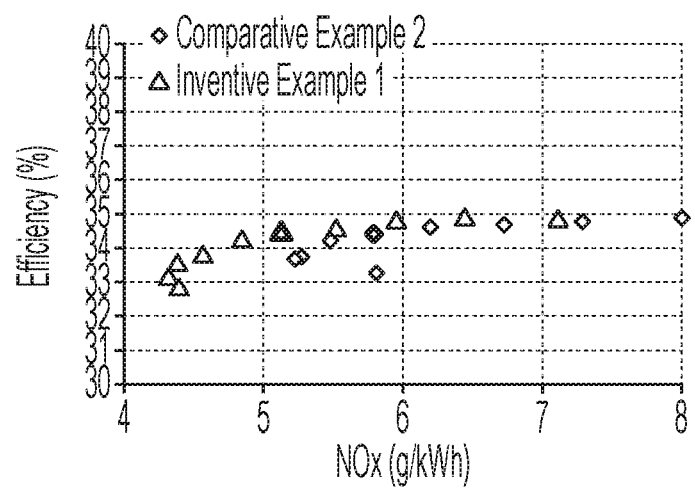
FIG. 5A graphically illustrates the NOx and efficiency trade-off at engine operating conditions of 1260 rpm and 25% of maximal load for commercially available diesel fuel and a fuel formulation according to one or more embodiments shown and described herein.
Figure 5B:
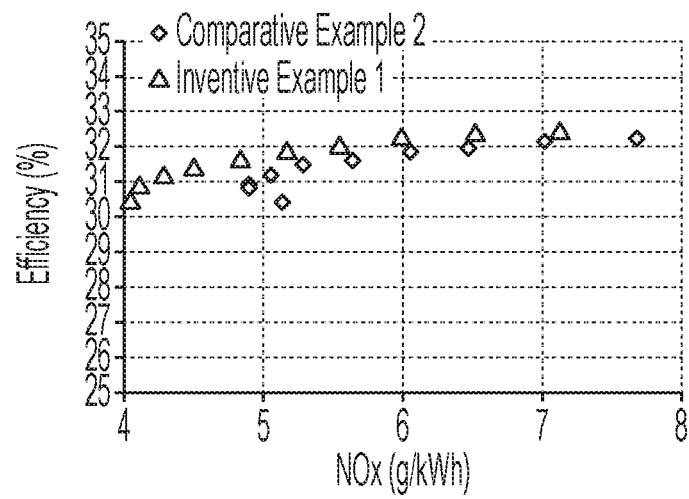
FIG. 5B graphically illustrates the NOx and efficiency trade-off at engine operating conditions of 1580 rpm and 25% of maximal load for commercially available diesel fuel and a fuel formulation according to one or more embodiments shown and described herein.
Figure 5C:
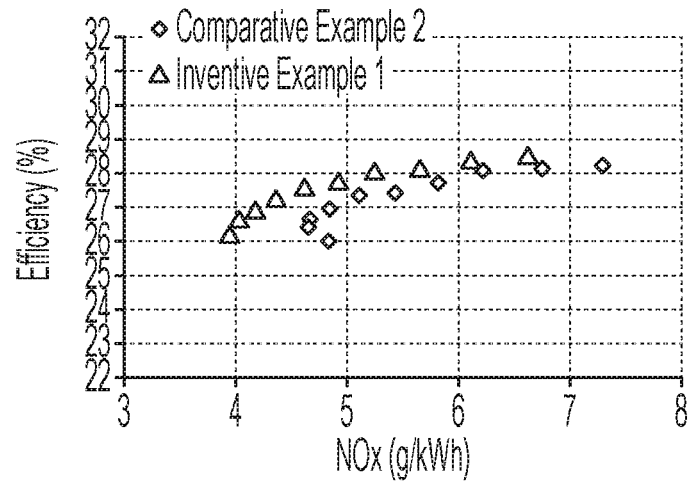
FIG. 5C graphically illustrates the NOx and efficiency trade-off at engine operating conditions of 1900 rpm and 25% of maximal load for commercially available diesel fuel and a fuel formulation according to one or more embodiments shown and described herein.
Figure 6A:
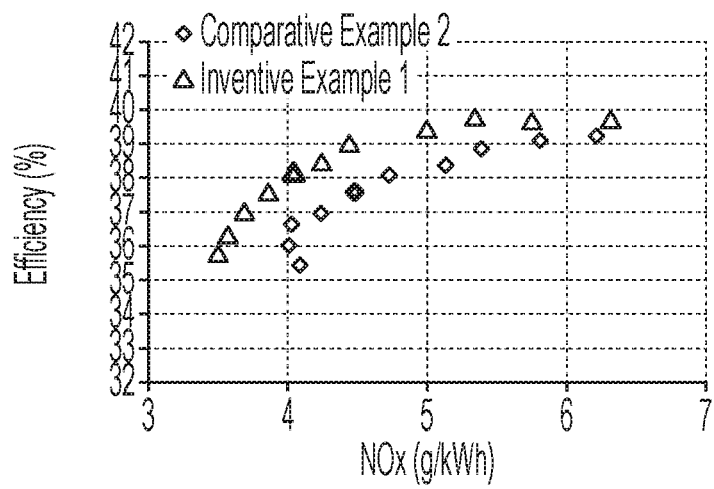
FIG. 6A graphically illustrates the NOx and efficiency trade-off at engine operating conditions of 1260 rpm and 50% of maximal load for commercially available diesel fuel and a fuel formulation according to one or more embodiments shown and described herein.
Figure 6B:
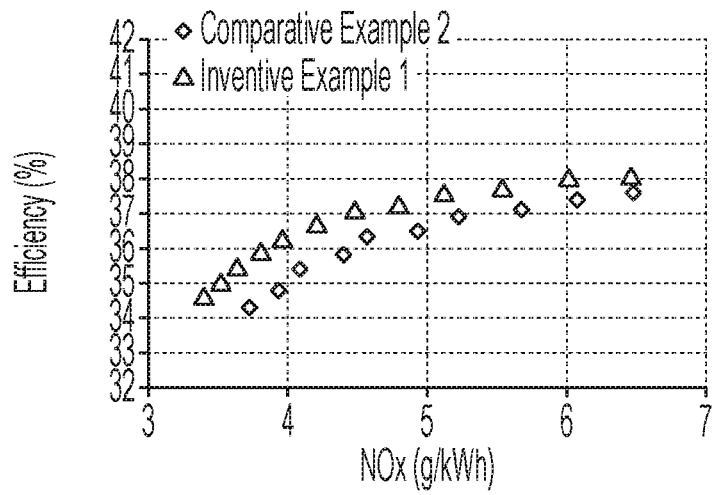
FIG. 6B graphically illustrates the NOx and efficiency trade-off at engine operating conditions of 1580 rpm and 50% of maximal load for commercially available diesel fuel and a fuel formulation according to one or more embodiments shown and described herein.
Figure 6C:
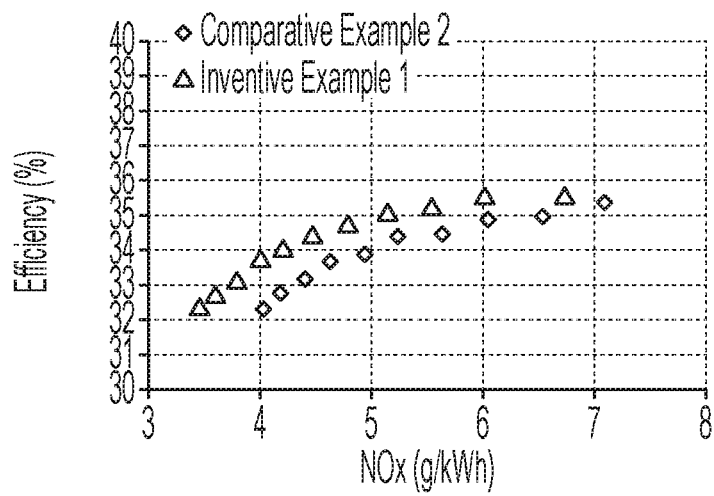
FIG. 6C graphically illustrates the NOx and efficiency trade-off at engine operating conditions of 1900 rpm and 50% of maximal load for commercially available diesel fuel and a fuel formulation according to one or more embodiments shown and described herein.
Figure 7A:
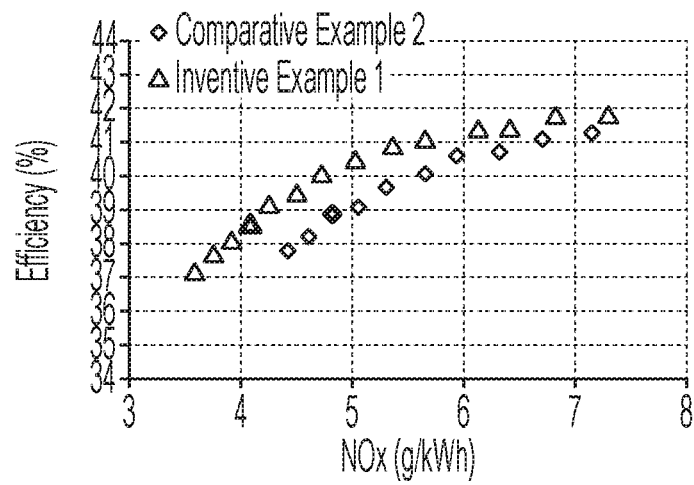
FIG. 7A graphically illustrates the NOx and efficiency trade-off at engine operating conditions of 1260 rpm and 75% of maximal load for commercially available diesel fuel and a fuel formulation according to one or more embodiments shown and described herein.
Figure 7B:
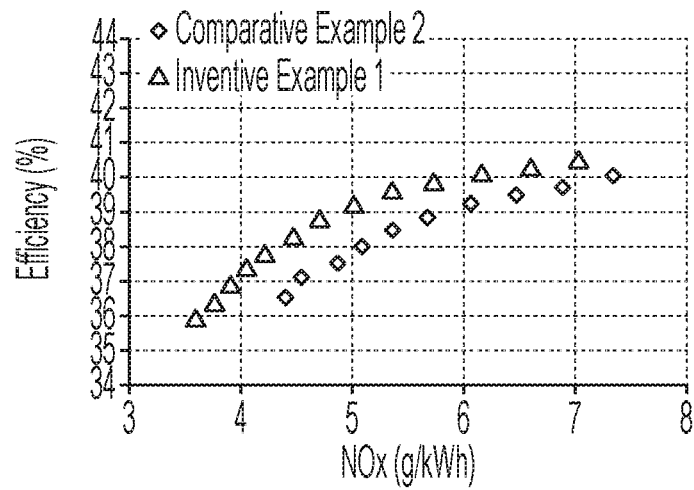
FIG. 7B graphically illustrates the NOx and efficiency trade-off at engine operating conditions of 1580 rpm and 75% of maximal load for commercially available diesel fuel and a fuel formulation according to one or more embodiments shown and described herein.
Figure 7C:
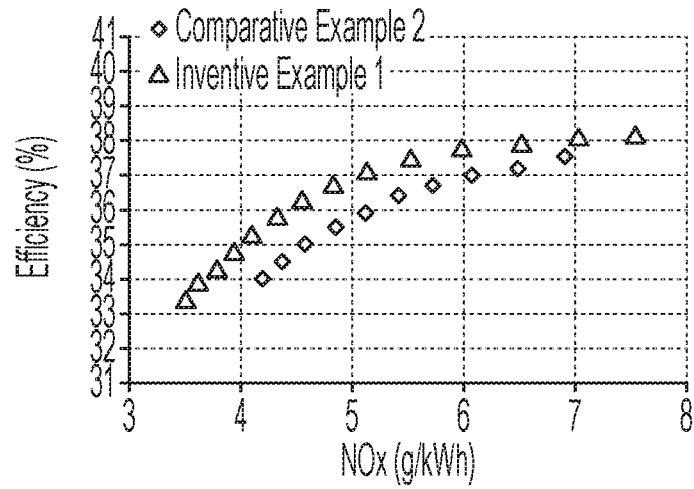
FIG. 7C graphically illustrates the NOx and efficiency trade-off at engine operating conditions of 1900 rpm and 75% of maximal load for commercially available diesel fuel and a fuel formulation according to one or more embodiments shown and described herein.
Figure 8A:
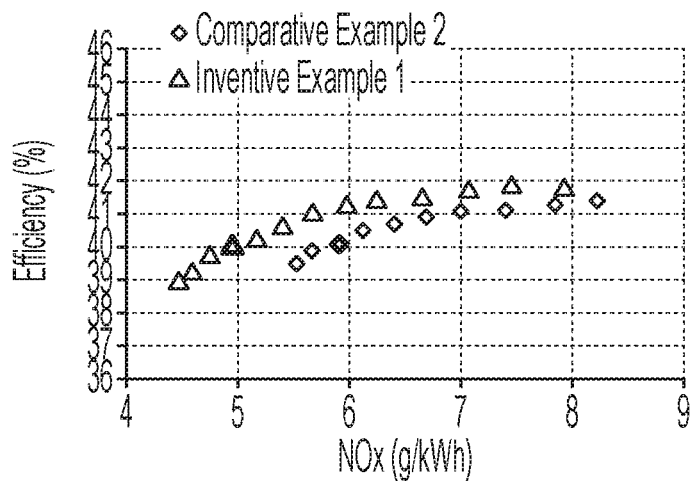
FIG. 8A graphically illustrates the NOx and efficiency trade-off at engine operating conditions of 1260 rpm and 100% of maximal load for commercially available diesel fuel and a fuel formulation according to one or more embodiments shown and described herein.
Figure 8B:
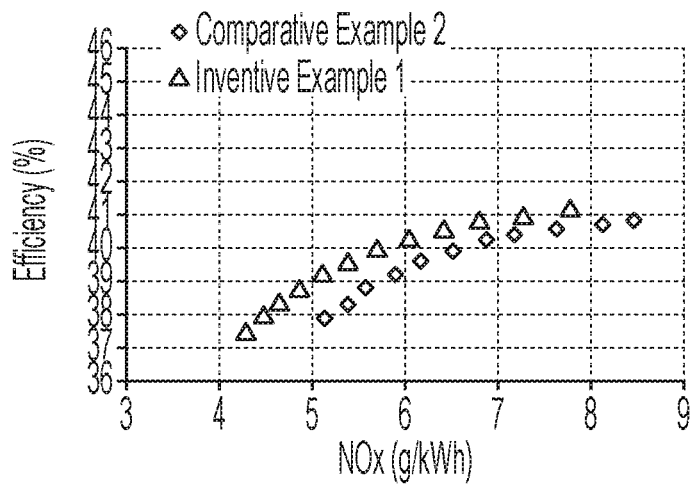
FIG. 8B graphically illustrates the NOx and efficiency trade-off at engine operating conditions of 1580 rpm and 100% of maximal load for commercially available diesel fuel and a fuel formulation according to one or more embodiments shown and described herein.
Figure 8C:
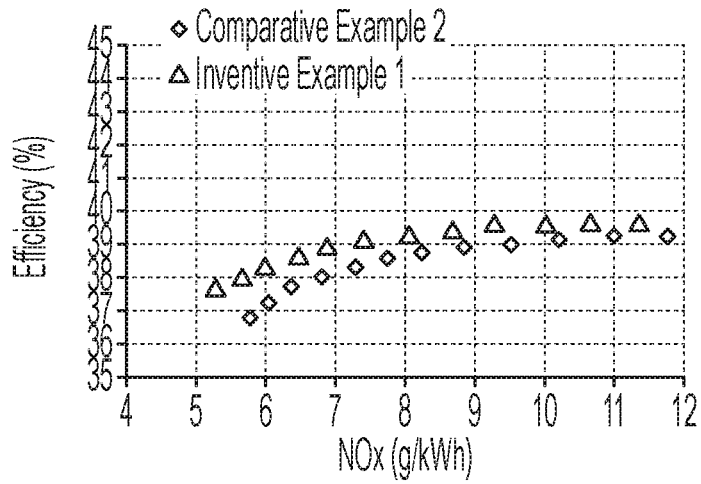
FIG. 8C graphically illustrates the NOx and efficiency trade-off at engine operating conditions of 1900 rpm and 100% of maximal load for commercially available diesel fuel and a fuel formulation according to one or more embodiments shown and described herein.
Figure 9A:
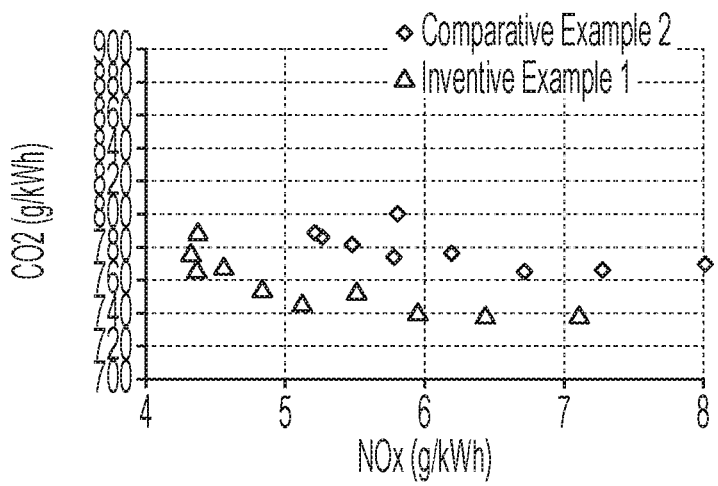
FIG. 9A graphically illustrates the NOx and $CO_2$ trade-off at engine operating conditions of 1260 rpm and 25% of maximal load for commercially available diesel fuel and a fuel formulation according to one or more embodiments shown and described herein.
Figure 9B:
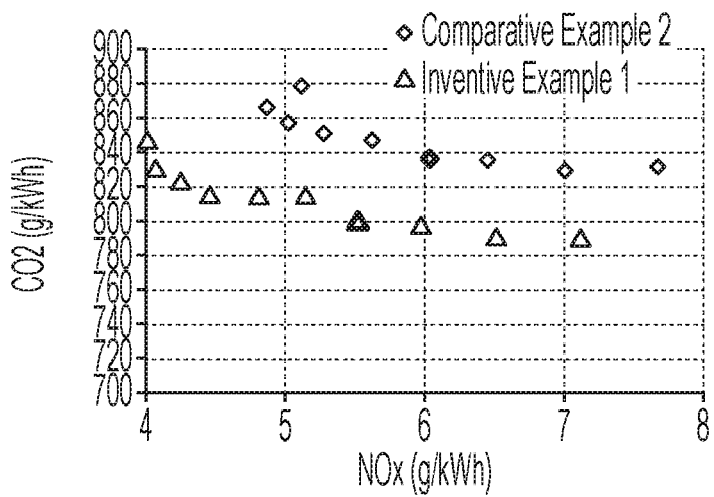
FIG. 9B graphically illustrates the NOx and $CO_2$ trade-off at engine operating conditions of 1580 rpm and 25% of maximal load for commercially available diesel fuel and a fuel formulation according to one or more embodiments shown and described herein.
Figure 9C:
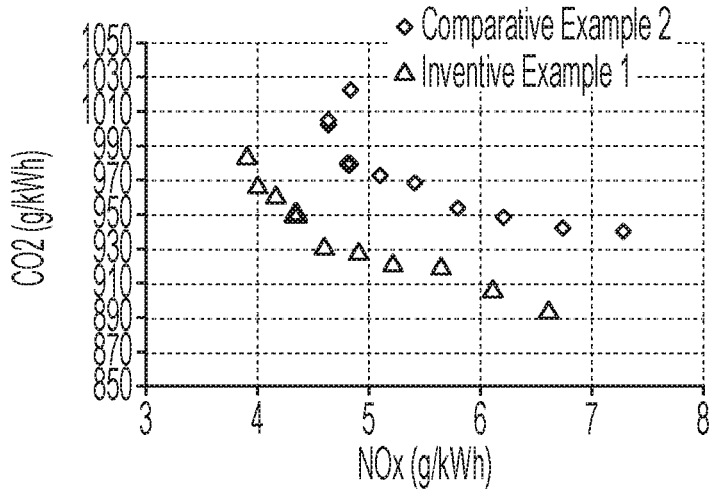
FIG. 9C graphically illustrates the NOx and $CO_2$ trade-off at engine operating conditions of 1900 rpm and 25% of maximal load for commercially available diesel fuel and a fuel formulation according to one or more embodiments shown and described herein.
Figure 10A:
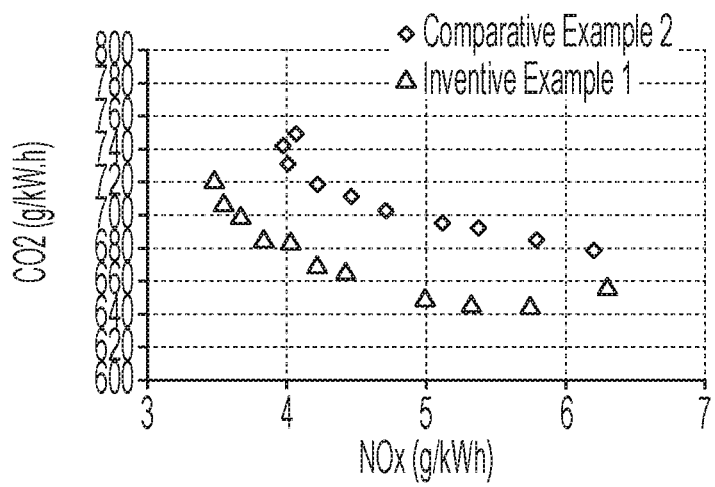
FIG. 10A graphically illustrates the NOx and $CO_2$ trade-off at engine operating conditions of 1260 rpm and 50% of maximal load for commercially available diesel fuel and a fuel formulation according to one or more embodiments shown and described herein.
Figure 10B:
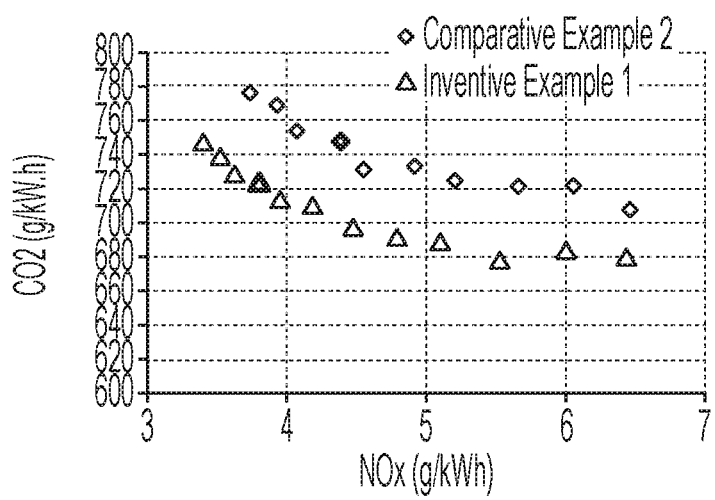
FIG. 10B graphically illustrates the NOx and $CO_2$ trade-off at engine operating conditions of 1580 rpm and 50% of maximal load for commercially available diesel fuel and a fuel formulation according to one or more embodiments shown and described herein.
Figure 10C:
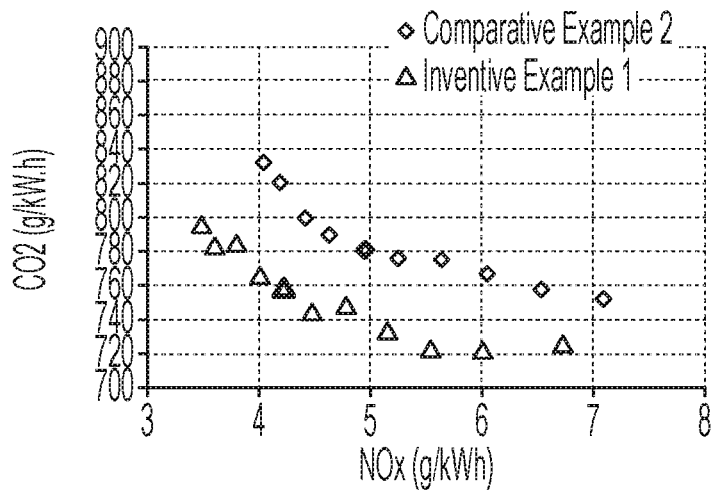
FIG. 10C graphically illustrates the NOx and $CO_2$ trade-off at engine operating conditions of 1900 rpm and 50% of maximal load for commercially available diesel fuel and a fuel formulation according to one or more embodiments shown and described herein.
Figure 11A:
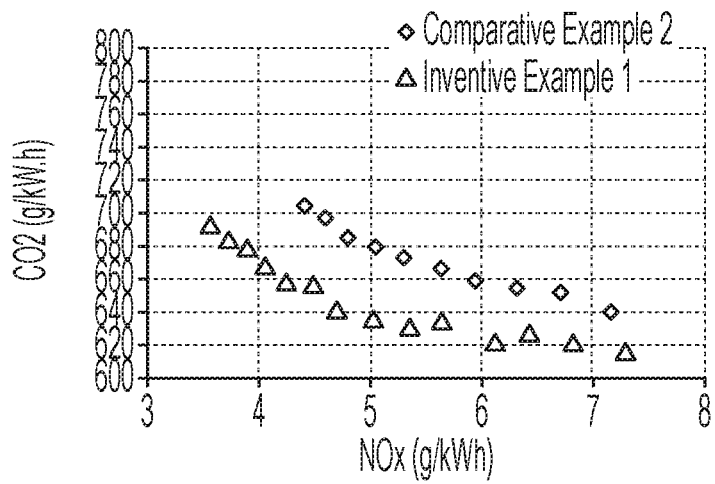
FIG. 11A graphically illustrates the NOx and $CO_2$ trade-off at engine operating conditions of 1260 rpm and 75% of maximal load for commercially available diesel fuel and a fuel formulation according to one or more embodiments shown and described herein.
Figure 11B:
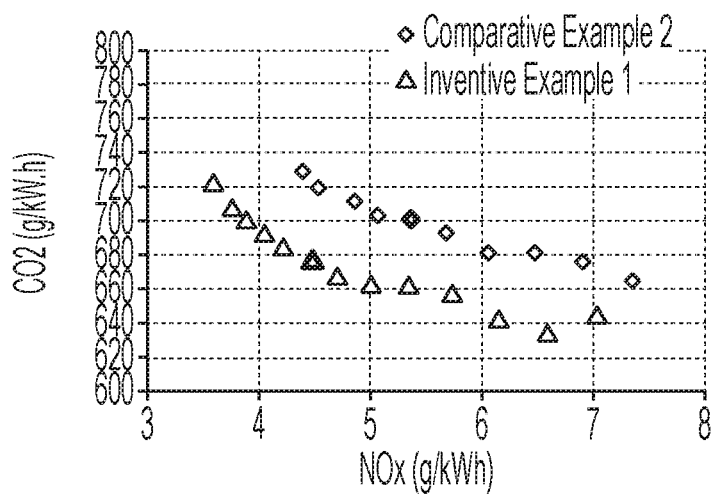
FIG. 11B graphically illustrates the NOx and $CO_2$ trade-off at engine operating conditions of 1580 rpm and 75% of maximal load for commercially available diesel fuel and a fuel formulation according to one or more embodiments shown and described herein.
Figure 11C:
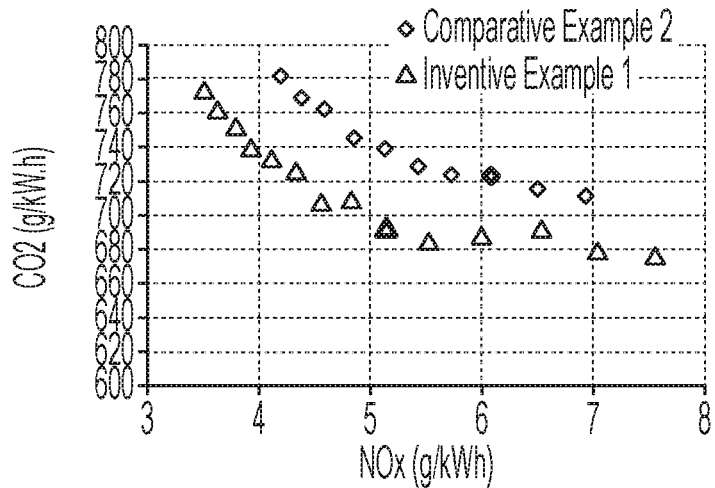
FIG. 11C graphically illustrates the NOx and $CO_2$ trade-off at engine operating conditions of 1900 rpm and 75% of maximal load for commercially available diesel fuel and a fuel formulation according to one or more embodiments shown and described herein.
Figure 12A:
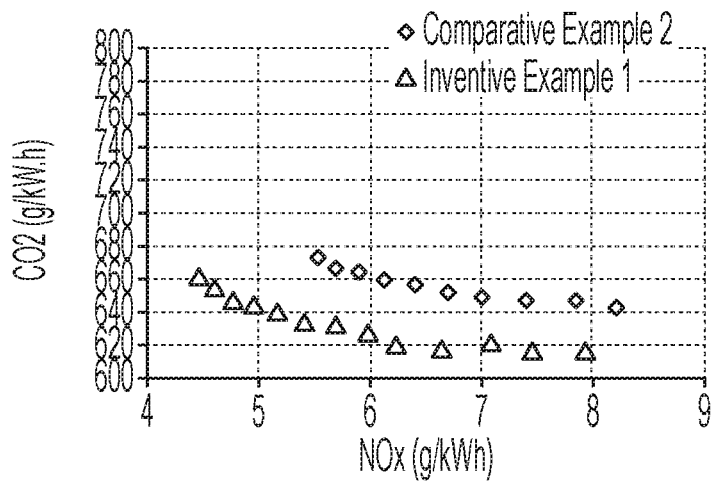
FIG. 12A graphically illustrates the NOx and $CO_2$ trade-off at engine operating conditions of 1260 rpm and 100% of maximal load for commercially available diesel fuel and a fuel formulation according to one or more embodiments shown and described herein.
Figure 12B:
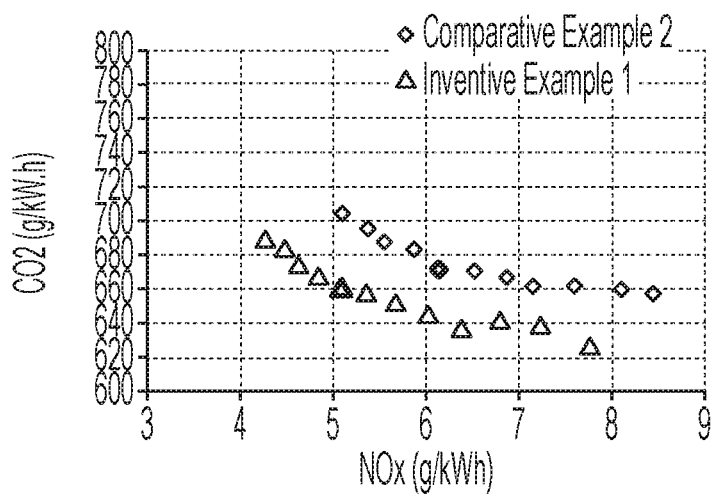
FIG. 12B graphically illustrates the NOx and $CO_2$ trade-off at engine operating conditions of 1580 rpm and 100% of maximal load for commercially available diesel fuel and a fuel formulation according to one or more embodiments shown and described herein.
Figure 12C:
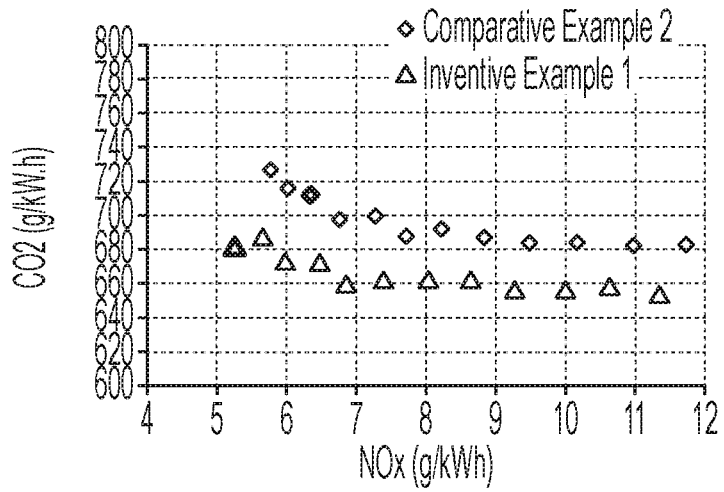
FIG. 12C graphically illustrates the NOx and $CO_2$ trade-off at engine operating conditions of 1900 rpm and 100% of maximal load for commercially available diesel fuel and a fuel formulation according to one or more embodiments shown and described herein.

Utilizing the data acquired at each of the 12 operating conditions demonstration of the utilization of the fuel formulations of the present disclosure (Inventive Example 1) as a means to reduce pollutant emissions relative to a baseline of conventional diesel fuel (Comparative Example 2) was demonstrated. Specifically, the acquired data demonstrated a simultaneous reduction in nitrogen oxides, soot/particulates, and $CO_2$ during engine operation. It will be appreciated that when using conventional fuels, it is common practice to have trade-off between these values with an improvement in one resulting in worsening of at least one other. Such simultaneous reduction in nitrogen oxides, soot/particulates, and $CO_2$ during engine operation is demonstrated in FIGS. 1A through 12C.

With reference to FIGS. 1A through 4C, comparison of the tradeoff between NOx and soot/particulates is studied. Specifically, at each of the 12 operating conditions there was a demonstrated decrease in both soot/particulate and NOx generation at the same SOI when the test engine was operated with the fuel formulation of Inventive Example 1 compared to the commercial diesel of Comparative Example 2. The improvement is illustrated with the placement of an arrow connecting the data points at the reference start of injection (SOI) for each of Inventive Examples 1 and Comparative Example 2. The slope of the arrow on each figure is indicative of an improved NOx/Soot trade-off and demonstrates the desirable emissions improvement when the test engine is operated with the fuel formulations of the present disclosure, such as Inventive Example 1.

With reference to FIGS. 5A through 8C, comparison of the tradeoff between NOx and efficiency is studied. Specifically, at each of the 12 operating conditions there was a demonstrated increase in efficiency of the test engine at a given NOx output when the test engine was operated with the fuel formulation of Inventive Example 1 compared to the commercial diesel of Comparative Example 2. The improvement is illustrated with the upward and lateral shift in the curve of data points for Inventive Examples 1 relative to the curve in the data points of Comparative Example 2. One skilled in the art will appreciate that the efficiency is the ratio of the power output (mechanical power produced by the engine) over the power input (the fuel mass flow injected in the engine). The mechanical power and the fuel mass flow may be experimentally measured on an engine dynamometer on which the engine equipped with a series of sensors is installed. As such, it will be understood that for a given power, the more efficient an engine is, the less fuel it consumes.

With reference to FIGS. 9A through 12C, comparison of the tradeoff between NOx and $CO_2$ is studied. Specifically, at each of the 12 operating conditions there was a demonstrated decrease in $CO_2$ emission from the test engine at a given NOx output when the test engine was operated with the fuel formulation of Inventive Example 1 compared to the commercial diesel of Comparative Example 2. The improvement is illustrated with the downward shift in the curve of data points for Inventive Examples 1 relative to the curve in the data points of Comparative Example 2.

Desirable behavior of the fuel formulation of Inventive Example 1 in a modern (Euro V) engine configuration and similar benefits were also observed. Specifically, an MD11 heavy-duty engine from Volvo was operated at the predefined operating points and demonstrated the same desirable operating performance. Table5 provides the BMEP corresponding to each operating condition.

TABLE 4

|  | A25 | A50 | A75 | A100 | B25 | B50 | B75 | B100 | C25 | C50 | C75 | C100 |
|---|---|---|---|---|---|---|---|---|---|---|---|---|
| Engine Speed (rpm) | 1213 | 1213 | 1213 | 1213 | 1534 | 1534 | 1534 | 1534 | 1856 | 1856 | 1856 | 1856 |
| Loading (%) | 25 | 50 | 75 | 100 | 25 | 50 | 75 | 100 | 25 | 50 | 75 | 100 |
| BMEP (bar) | 6.4 | 12.8 | 19.2 | 25.5 | 6.2 | 12.4 | 18.6 | 24.1 | 5.2 | 10.3 | 15.5 | 20.4 |

As such, it will be appreciated that the fuel formulation of Inventive Example 1 in conformity with the fuel formulations of the present disclosure leads to significant soot/particulate reduction, NOx reduction, as well as measurable $CO_2$ reduction over the entire engine operating range. This means that, used as a drop-in solution, the fuel formulations of the present disclosure marks an advance in the reduction of local pollution in the areas of the world where the engine fleet is still composed of mainly older engines (Euro II). Since a rapid change of the entire engine fleet is not a viable solution, because of associated costs, the drop-in fuel option in accordance with the present disclosure opens many opportunities for improving air quality in these regions.

It should now be understood the various aspects of the fuel formulation having a derived cetane number of at least 35 and associated method for reducing emissions in a compression-ignited engine utilizing the same are described and such aspects may be utilized in conjunction with various other aspects.

According to a first aspect, a fuel formulation having a derived cetane number of at least 35 includes a petroleum fraction comprising a naphtha fraction with a boiling point in the range from 30° C. to 178° C. and a polyoxymethylene dimethyl ether (OMEx) oligomer mix of a general formula $H_3CO-(CH_2O)_n-CH_3$ in which n is between 2 and 7, inclusive.

A second aspect includes the fuel formulation of the first aspect in which the fuel formulation comprises at least 10 percent by mass of the polyoxymethylene dimethyl ether oligomer mix.

A third aspect includes the fuel formulation of the first aspect in which the fuel formulation comprises 10 to 20 percent by mass of the polyoxymethylene dimethyl ether oligomer mix.

A fourth aspect includes the fuel formulation of any of the first through third aspects in which at least 90 weight percent of the polyoxymethylene dimethyl ether (OMEx) oligomer mix comprises a value for n of 3 or 4.

A fifth aspect includes the fuel formulation of any of the first through fourth aspects in which the fuel formulation further comprises a pro-cetane additive.

A sixth aspect includes the fuel formulation of the fifth aspect in which the pro-cetane additive is a nitroalkane.

A seventh aspect includes the fuel formulation of the sixth aspect in which the pro-cetane additive is 2-ethylhexy nitrate (2-EHN).

An eighth aspect includes the fuel formulation of any of the fifth through seventh aspects in which the fuel formulation comprises the pro-cetane additive at 100 parts per million to 5 percent by volume.

A ninth aspect includes the fuel formulation of any of the fifth through seventh aspects in which the fuel formulation comprises the pro-cetane additive at 0.25 to 2 percent by volume.

A tenth aspect includes the fuel formulation of any of the first through ninth aspects in which the petroleum fraction comprises a naphtha fraction with a boiling point in the range from 85° C. to 178° C.

An eleventh aspect includes the fuel formulation of any of the first through ninth aspects in which the petroleum fraction comprises a naphtha fraction with a boiling point in the range from 70° C. to 150° C.

A twelfth aspect includes the fuel formulation of any of the first through ninth aspects in which the petroleum fraction comprises a naphtha fraction with a boiling point in the range from 30° C. to 70° C.

A thirteenth aspect includes the fuel formulation of any of the first through twelfth aspects in which the petroleum fraction comprises less than 25 percent by volume aromatics.

A fourteenth aspect includes the fuel formulation of any of the first through twelfth aspects in which the petroleum fraction comprises less than 10 percent by volume aromatics.

A fifteenth aspect includes the fuel formulation of any of the first through fourteenth aspects in which the petroleum fraction comprises 60 to 100 percent by volume of the naphtha fraction.

A sixteenth aspect includes the fuel formulation of any of the first through fourteenth aspects in which the petroleum fraction comprises 95 to 100 percent by volume of the naphtha fraction.

According to a seventeenth aspect, a method for reducing emissions in a compression-ignited engine includes a petroleum preparing a fuel formulation according to any of the first through sixteenth aspects and combusting the fuel formulation in the compression-ignited engine in place of a diesel fuel, thereby reducing emission of at least one of NOx, $CO_2$, or particulates from the compression-ignited engine.

Having described the subject matter of the present disclosure in detail and by reference to specific embodiments, it is noted that the various details described in this disclosure should not be taken to imply that these details relate to elements that are essential to the various embodiments described in this disclosure. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Throughout this disclosure ranges are provided. It is envisioned that each discrete value encompassed by the ranges are also included. Additionally, the ranges which may be formed by each discrete value encompassed by the explicitly disclosed ranges are equally envisioned.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A fuel formulation having a derived cetane number of at least 35, the fuel formulation consisting of
   a petroleum fraction comprising 80 to 90 percent by volume a naphtha fraction consisting of hydrocarbons with a boiling point in the range from 30° C. to 150° C.;
   a polyoxymethylene dimethyl ether (OMEx) oligomer mix of a general formula $H_3CO—(CH_2O)_n—CH_3$ in which n is between 3 or 4, inclusive, wherein the fuel formulation comprises 10 to 20 percent by mass of the polyoxymethylene dimethyl ether oligomer mix; and
   one or more additives at 0 to 5 percent by volume of the fuel formulation, the additive selected from a pro-cetane, or a lubricity additive.

2. The fuel formulation of claim 1, wherein the fuel formulation further comprises the one or more additives, the one or more additives comprising a pro-cetane additive at 100 parts per million to 5 percent by volume.

3. The fuel formulation of claim 2, wherein the pro-cetane additive is a nitroalkane.

4. The fuel formulation of claim 3, wherein the pro-cetane additive is 2-ethylhexy nitrate (2-EHN).

5. The fuel formulation of claim 2, wherein the fuel formulation comprises the pro-cetane additive at 0.25 to 2 percent by volume.

6. The fuel formulation of claim 1, wherein the naphtha fraction consists of hydrocarbons with a boiling point in the range from 85° C. to 150° C.

7. The fuel formulation of claim 1, wherein the naphtha fraction consists of hydrocarbons with a boiling point in the range from 70° C. to 150° C.

8. The fuel formulation of claim 1, wherein the naphtha fraction consists of hydrocarbons with a boiling point in the range from 30° C. to 70° C.

9. The fuel formulation of claim 1, wherein the petroleum fraction comprises less than 25 percent by volume aromatics.

10. The fuel formulation of claim 1, wherein the petroleum fraction comprises less than 10 percent by volume aromatics.

11. A method for reducing emissions in a compression-ignited engine consisting of the steps of:
    preparing a fuel formulation consisting of
      a petroleum fraction comprising 80 to 90 percent by volume a naphtha fraction consisting of hydrocarbons with a boiling point in the range from 30° C. to 150° C.,
      a polyoxymethylene dimethyl ether (OMEx) oligomer mix of a general formula $H_3CO—(CH_2O)_n—CH_3$ in which n is between 3 or 4, inclusive, wherein the fuel formulation comprises 10 to 20 percent by mass of the polyoxymethylene dimethyl ether oligomer mix, and
      one or more additives at 0 to 5 percent by volume of the fuel formulation, the additive selected from a pro-cetane, or a lubricity additive; and
    combusting exclusively the fuel formulation in the compression-ignited engine, thereby reducing emission of at least one of NOx, $CO_2$, or particulates from the compression-ignited engine compared to combustion of diesel fuel in the compression-ignited engine.

12. The method of claim 11, wherein the fuel formulation further comprises the one or more additives, the one or more additives comprising a pro-cetane additive at 100 parts per million to 5 percent by volume.

13. The method of claim 11, wherein the naphtha fraction consists of hydrocarbons with a boiling point in the range from 85° C. to 150° C.

14. The method of claim 11, wherein the petroleum fraction comprises less than 25 percent by volume aromatics.

* * * * *